United States Patent [19]

Bodine

[11] 4,323,119

[45] Apr. 6, 1982

[54] VIBRATORY APPARATUS FOR MINING SHALE OIL OR THE LIKE

[76] Inventor: Albert G. Bodine, 7877 Woodley Ave., Van Nuys, Calif. 91406

[21] Appl. No.: 209,527

[22] Filed: Nov. 24, 1980

Related U.S. Application Data

[62] Division of Ser. No. 12,669, Feb. 16, 1979, Pat. No. 4,252,189.

[51] Int. Cl.³ .................. E21B 43/00; E21C 37/20
[52] U.S. Cl. .................................. 166/177; 166/249
[58] Field of Search .......................... 166/177, 249

[56] References Cited

U.S. PATENT DOCUMENTS

| Re. 23,381 | 6/1951 | Bodine, Jr. | 166/249 |
|---|---|---|---|
| 2,871,943 | 2/1959 | Bodine, Jr. | 166/249 |
| 2,973,312 | 2/1961 | Logan | 166/249 X |
| 3,189,536 | 6/1965 | Bodine | 166/177 X |
| 3,378,075 | 4/1968 | Bodine | 166/177 X |
| 3,497,005 | 2/1970 | Pelopsky et al. | 166/249 |
| 3,527,300 | 9/1970 | Phillips | 166/249 |
| 3,848,672 | 11/1974 | Bodine | 166/249 |
| 4,109,715 | 8/1978 | Adamson | 166/177 |

*Primary Examiner*—Stephen J. Novosad
*Attorney, Agent, or Firm*—Edward A. Sokolski

[57] ABSTRACT

Shale or the like having hydrocarbon deposits therein is exposed to a liquid carrier medium such as water or distillate. High level vibratory energy is applied to the hydrocarbon carrying shale and the liquid to cause the oil shale to comminute so as to release the hydrocarbon therefrom, the hydrocarbon itself being comminuted and suspended in the carrier liquid, which liquid is then removed and the oil separated therefrom.

4 Claims, 5 Drawing Figures

VIBRATORY APPARATUS FOR MINING SHALE OIL OR THE LIKE

This application is a divisional of my Patent Application Ser. No. 012,669, filed Feb. 16, 1979, now U.S. Pat. No. 4,252,189.

This invention relates to the mining of shale oil and similar hydrocarbons, and more particularly to apparatus for such mining involving the use of a carrier liquid in conjunction with sonic energy wherein the sonic energy comminutes the kerogen which is suspended in the liquid for subsequent separation therefrom. Shale oil is generally found in the form of a hydrocarbon called kerogen which is a wax-like hydrocarbon packed between multiple layers of shale. While oil shale has been a known source of oil for many years, no efficient means has been found to date for the extraction of the oil from the kerogen deposits within the shale. Mining the shale by conventional procedures, followed by above ground processing involving retorting (heating) of the kerogen, has been used to a limited degree for a number of years. However, in view of the relatively small yield of oil from each ton of shale mined and processed, this approach has been regarded as of questionable economical feasibility. Further, this approach presents the problem of disposing of large quantities of spent shale. In order to overcome these difficulties, in situ processing of oil shale has been tried experimentally in recent years. Such in situ processes of the prior art are implemented by the sinking of a shaft into the oil shale formation and then forcing hot combustion gases through the oil shale to convert the solid organic kerogen contained therein to oil which is then drawn to the surface.

In my U.S. Pat. No. 3,848,672, issued Nov. 19, 1974, a technique and apparatus have been described for engendering the highly efficient transfer of the available energy to the carbonaceous kerogen material by applying concentrated vibratory energy to the material to aid in the breakdown of such material while the retorting is being accomplished.

The present invention affords an advantage over the technique described in my aforementioned patent for certain application requirements in that it enables the breakdown of the kerogen material without the need for retorting but for, in some situations, a limited amount of heating of the kerogen material. This end result is achieved by introducing high level sonic vibrations into the kerogen layers in the presence of a carrier liquid which results in comminution of the kerogen such that it is suspended in the liquid. If the liquid used is a petroleum solvent, such as kerosene, or other petroleum distillate, most of the kerogen can be made to dissolve into the carrier as a result of the vibratory action. In certain embodiments of the invention, the vibratory energy is applied directly to the oil shale in situ so as to disintegrate the kerogen and shale layers while a carrier liquid is being applied thereto. In such situations, the vibratory energy not only separates the kerogen from the shale, but, in addition, comminutes the lower acoustic reactive impedance kerogen rather rapidly because it has acoustic energy absorption characteristics, the vibratory action aiding the suspension of the kerogen particles in the carrier liquid (or dissolutioned therein if a petroleum distillate is used). The kerogen has a low acoustic reactive impedance relative to the shale, but a high resistive impedance, so that the pressure pulses cause separation.

The lighter kerogen components tend to rise in the liquid, while heavier rock particles tend to sink, thereby facilitating separation in the liquid medium such that the kerogen containing portion of the liquid can be readily removed without particles of shale therein.

In one embodiment of my invention, the removal of the kerogen is achieved by feeding kerogen containing oil shale into a liquid containing tub wherein the vibratory energy is applied to effect the desired suspension of the kerogen particles in the liquid. In other embodiments of the invention, the removal of the kerogen is achieved in situ by introducing a liquid through a mining shaft to the kerogen and shale deposits and applying sonic energy to the shale and the liquid engulfing the shale and kerogen.

It is therefore the principal object of my invention to facilitate the mining of shale oil.

It is a further object of my invention to enable the removal of kerogen deposits from shale without the need of heating the kerogen material.

It is still another object of my invention to provide a highly efficient technique and apparatus for separating kerogen material from shale, comminuting the kerogen material, and suspending or dissolving the communited kerogen in a carrier liquid for removal and transportation.

Other objects of this invention will become apparent as the description proceeds in connection with the accompanying drawings of which:

Figure 1:
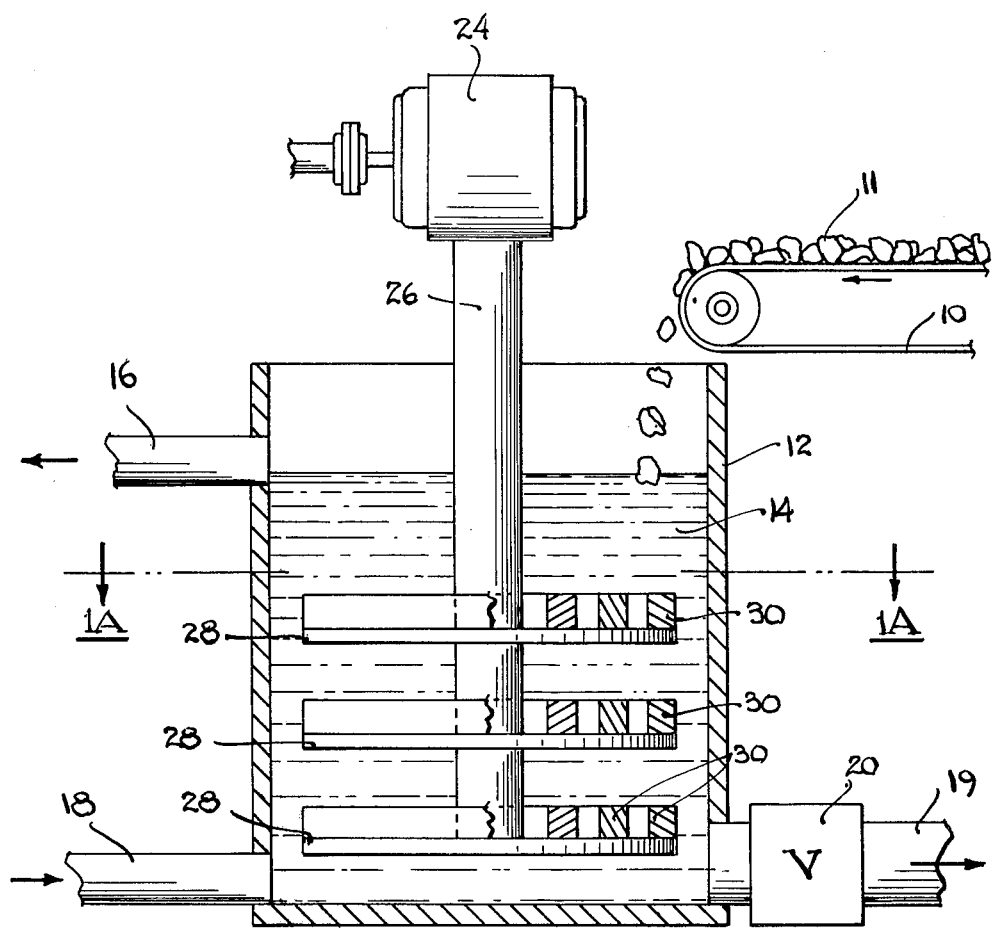
FIG. 1 is an elevational view in cross section illustrating a first embodiment of my invention.

Preferably the sonic energy employed is at a frequency such as to cause resonant elastic vibration of a vibration system including the components involved in transmitting the sonic energy from a sonic oscillator to the kerogen and shale material. Such resonant vibration greatly increases the efficiency of operation and enables the generation of much higher amplitude sonic waves than is otherwise possible.

It has been found most helpful in analyzing the technique of this invention to analogize the acoustically vibrating circuit utilized to an equivalent electrical circuit. This sort of approach to analysis is well known to those skilled in the art and is described, for example, in Chapter 2 of *Sonics*, by Heuter and Bolt, published in 1955 by John Wiley and Sons. In making such an analogy, force F is equated with electrical voltage E, velocity of vibration u is equated with electrical current i, mechanical compliance $C_m$ is equated with electrical resistance R and mechanical impedance $Z_m$ is equated with electrical impedance $Z_e$.

Thus, it can be shown that if a member is elastically vibrated by means of an acoustical sinusoidal force $F_o \sin \omega t$ ($\omega$ being equal to $2\pi$ times the frequency of vibration), $$Z_m = R_m = j(\omega M - 1/\omega C_m) = F_o \sin \omega t/u \quad (1)$$

Where $\omega M$ is equal to $1/\omega C_m$, a resonant condition exists, and the effective mechanical impedance $Z_m$ is equal to the mechanical resistance $R_m$, the reactive impedance components $\omega M$ and $1/\omega C_m$ cancelling each other out. Under such a resonant condition, velocity of vibration u is at a maximum, power factor is unity, and energy is more efficiently delivered to a load to which the resonant system may be coupled.

It is important to note the significance of the attainment of high acoustical Q in the resonant system being driven, to increase the efficiency of the vibration thereof and to provide a maximum amount of power. As for an equivalent electrical circuit, the Q of an acoustically vibrating circuit is defined as the sharpness of resonance thereof and is indicative of the ratio of the energy stored in each vibration cycle to the energy used in each such cycle. Q is mathematically equated to the ratio between $\omega M$ and $R_m$. Thus, the effective Q of the vibrating circuit can be maximized to make for highly efficient, high-amplitude vibration by minimizing the effect of friction in the circuit and/or maximizing the effect of mass in such circuit.

In considering the significance of the parameters described in connection with equation (1), it should be kept in mind that the total effective resistance, mass and compliance in the acoustically vibrating circuit are represented in the equation and that these parameters may be distributed through the system rather than being lumped in any one component or portion thereof.

It is also to be noted that orbiting mass oscillators may be utilized in the implementation of the invention that automatically adjust their output frequency and phase to maintain resonance with changes in the characteristics of the load. Thus, in the face of changes in the effective mass and compliance presented by the load with changes in the conditions of the work material as it is heated and sonically excited, the system automatically is maintained in optimum resonant operation by virtue of the "lock-in" characteristic of Applicant's unique orbiting mass oscillators. Furthermore, in this connection the orbiting mass oscillator automatically changes not only its frequency but its phase angle and therefore its power factor with changes in the resistive impedance load, to assure optimum efficiency of operation at all times.

Figure 1A:
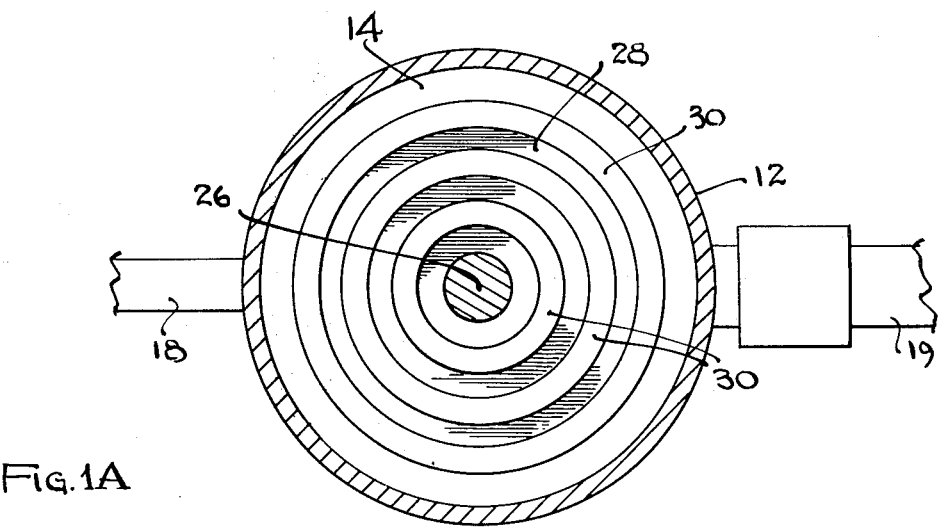
FIG. 1A is a cross-sectional view taken along the plane indicated by 1A-1A in FIG. 1.

Referring now to FIGS. 1 and 1A, a first embodiment of the invention is illustrated. This first embodiment involves a method and apparatus wherein the oil bearing shale is removed from the ground in the form of pieces of shale which are processed above ground, either at the site or a location remote therefrom. Container 12 has a liquid 14 contained therein which may be water or may be a petroleum distillate, such as kerosene. This liquid is pumped into the container through line 18. Column 26, which may be a suitable elastic material such as steel, is fixedly suspended within container 12 by suitable support means (not shown). Attached to one end of column 26 is a vibration generator 24 which may comprise an orbiting mass oscillator, such as that described in connection with FIGS. 2 or 3 of my U.S. Pat. No. 3,633,877. Fixedly supported on column 26 are a plurality of tray members 28 which are fabricated from an elastic material such as steel. Loosely supported on trays 28 are a plurality of concentric, heavy metallic ring members 30. Ring members 30 are of a very heavy metallic material so that they will randomly shake, rather than resonantly vibrate with, the plates and the column. Kerogen bearing pieces of shale 11, to be processed, are fed into container 12 on conveyor belt 10. An outlet line 16 is provided for pumping out kerogen bearing liquid that has been separated from the shale. The kerogen particles rise to the top of the liquid 14 while the shale particles fall to the bottom of the container and are excited through line 19, valve 20 being provided to control the removal of this sludge material.

In operation, orbiting mass oscillator 24 preferably is adjusted to a speed which will cause resonant standing wave vibration of the vibration system including column 26 and trays 28. This results in high level vibrational energy being transferred from the column and the trays to the liquid. The larger pieces of oil shale chunks first fall onto trays 28 where they are subjected to direct vibrational mechanical "hammering" which breaks the shale into relatively small pieces. This "hammering" action is aided by the action of ring members 30 which randomly vibrate against the surfaces of the trays 28, thus providing highly effective pulverizing action. Simultaneously, high level sonic energy is transferred to liquid 14, resulting in compression forces against the oil shale pieces. The acoustically dissipative kerogen is particularly susceptible to the vibratory environment because of its high hysteresis for sonics. The combined vibratory effect of the trays, rings and liquid effectively comminutes the oil shale particles. In this comminution process, the kerogen rapidly absorbs the vibratory energy and is effectively separated from the shale in liquid 14, the lighter kerogen particles rising to the top of the liquid, while the heavier shale particles tend to descend to the bottom of tank 12. High level stirring action engendered in liquid, due to the sonic energy, tends to enhance the movement of the oil shale particles around in the container 12 with the result that such particles are repeatedly passed between surfaces of trays 28 and rings 30, thereby providing highly effective crushing action. As already noted, if liquid 14 is a petroleum distillate such as kerosene, the particles of kerogen will dissolve therein. It is important to note that by adjusting the pumping rate at which liquid is fed into container 12 through inlet 18, the average velocity of liquid 14 can be controlled as it moves upwardly toward outlet 16. In this manner, the lighter particles of kerogen will be efficiently swept upwardly and out through outlet 16, while the heavier shale particles will sink to the bottom of the tank for removal from the tank through outlet line 19.

Figure 2:
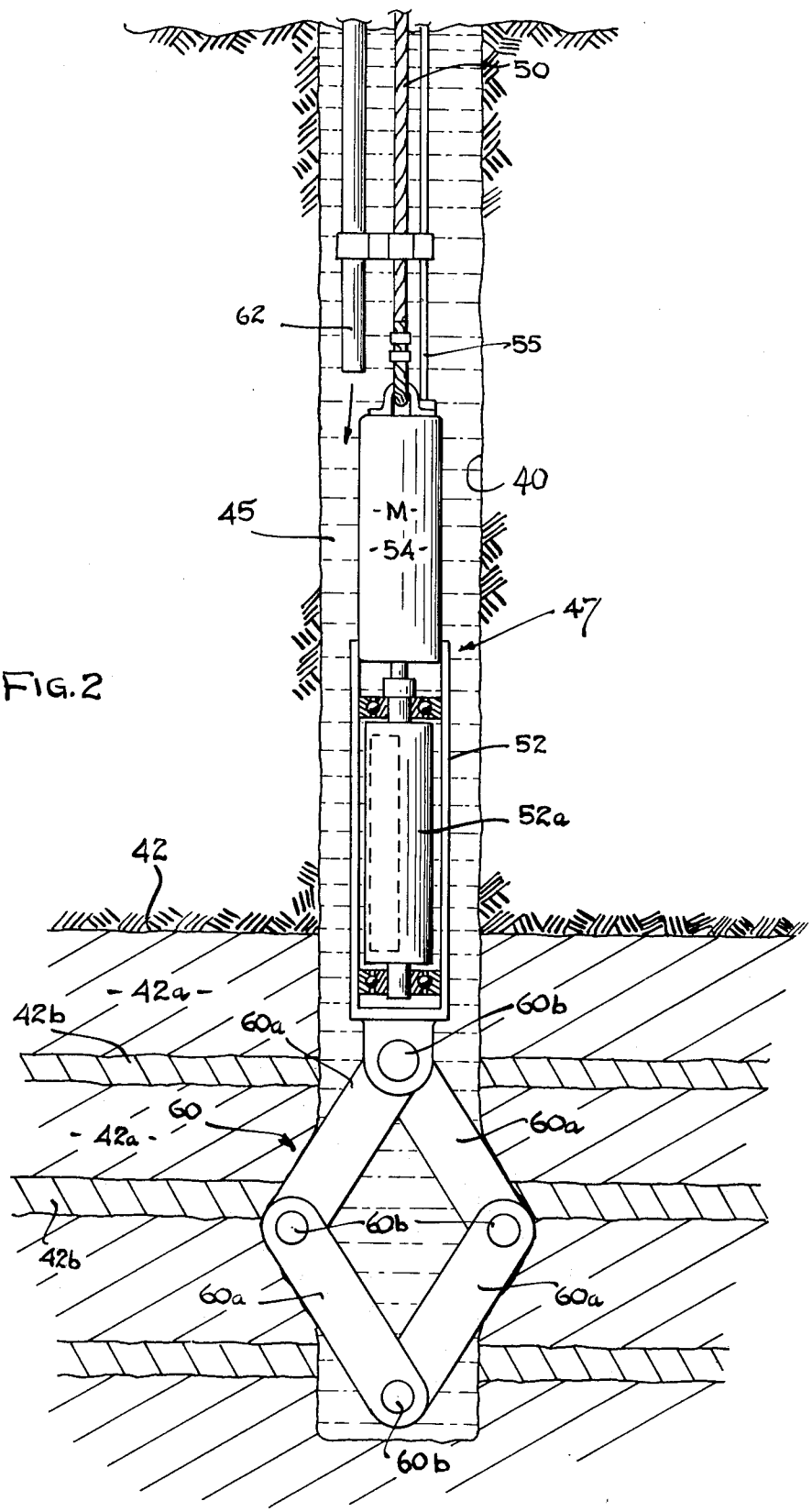
FIG. 2 is an elevational view in cross section of a second embodiment of my invention.

Referring now to FIG. 2, a second embodiment of the invention is illustrated, this embodiment being suitable for use in in situ processing. In implementing the second embodiment, a well 40 is first drilled down into the shale oil formation 42 which includes alternate layers 42a and 42b of shale and kerogen respectively. The shale oil deposits then preferably are initially broken up by shooting a dynamite charge down the hole. A vibration generating and radiating mechanism 47 is then lowered into well 40 by means of support cable 50. The vibration generating and radiating device includes a sonic vibration generator 52 which is preferably of the orbiting mass type and includes an eccentrically weighted rotor member 52a which is rotatably driven by means of an electric motor 54, power being supplied to motor 54 through electric cable 55. Orbiting mass oscillator 52 may be of the type described in my U.S. Pat. No. 3,360,056 wherein eccentrically weighted rotor 52a generates lateral or gyratory vibrations when rotated by motor 54. Attached to the casing of oscillator 52 is toggle mechanism 60 which comprises four leg portions 60a which are pivotally joined together and to the oscillator at pivotal joints 60b. Toggle mechanism 60 thus operates in scissors fashion when it is bottomed in the well expanding outwardly against the sides of the well in response to the weight of the motor and oscillator and the vibratory action.

The device is operated as follows: With the unit installed in the well as shown in FIG. 2, a carrier liquid 45 is introduced into the well through hose 62. Carrier liquid 45 may be water, or it may be a petroleum distillate such as kerosene, in which the kerogen particles can be dissolved. With the liquid in the well, such that it initially covers the shale oil layers to be operated on, high level vibratory energy is generated by rotatably driving oscillator 52 by means of motor 54. The frequency of rotation of oscillator rotor 52a is preferably adjusted so to cause resonant elastic vibration of toggle mechanism 60, thus affording very high level vibrational energy. The vibrational energy is transferred from toggle mechanism 60 to liquid 45 and to the shale oil formation resulting in comminution of the shale oil. The toggle mechanism tends to collapse and thus create an ever increasing cavity extending out from the initial side wall, thus increasing the treatment volume. The lighter kerogen deposits 42b are effectively separated from the heavier shale material in the liquid by the vibratory action, particularly in view of the difference in mass between these two materials which results in different amplitudes of vibration for these materials. The lighter kerogen deposits will rise to the top of the liquid while the heavier shale will tend to fall to the bottom thereof. Where the liquid is a solvent, such as kerosene, the kerogen will dissolve in such liquid while where it is a non-solvent such as water, the kerogen will become suspended in the liquid. The liquid is flowed through hose 62 into the well to a suitable level such that the top portions of the liquid bearing the kerogen will flow out of the well where they can be suitably collected for processing. The shale material, on the other hand, falls to the bottom of the well where it can be left deposited. With certain types of kerogen material, the process can be speeded up by preheating the liquid fed into the well from hose 62.

Figure 3:
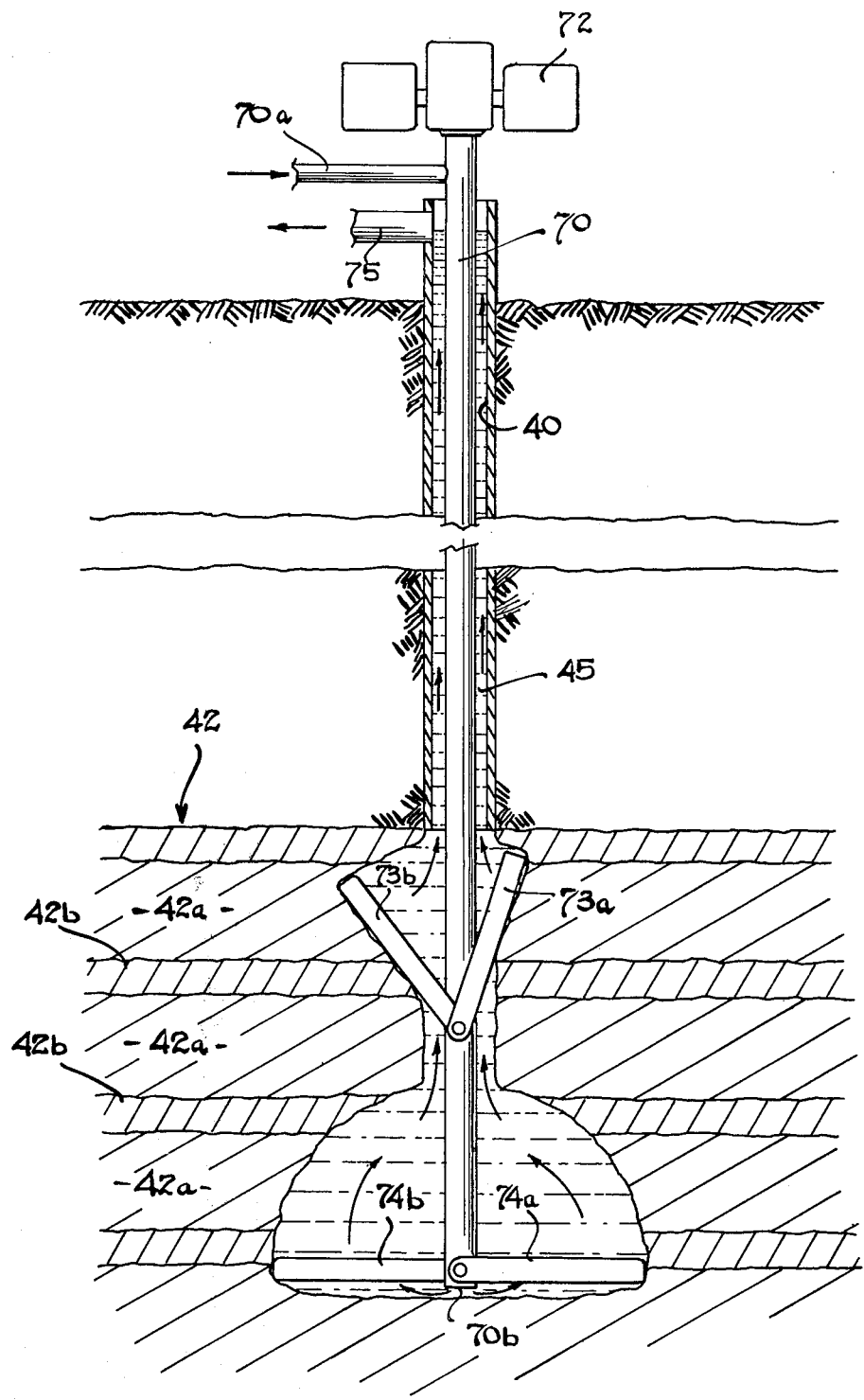
FIG. 3 is an elevational view in cross section of a third embodiment of the invention.

Referring to FIG. 3, another embodiment of the invention for in situ processing of the shale oil in a well is illustrated. The technique used in this embodiment is similar to that of FIG. 2, but employs a different means for transmitting the vibratory energy to the shale oil deposits. Tubular column 70 is suspended in well 40 by means of suitable support means (not shown). Tubular column 70 is fabricated of an elastic material such as steel. Attached to one end of column 70 is an orbiting mass oscillator 72. Oscillator 72 may be of the type described in my U.S. Pat. No. 3,684,037, issued Aug. 15, 1972. An inlet 70a is provided near the top end of tubular column 70 for feeding the carrier liquid into the column. This fluid is excited from the column into the well through the bottom open end 70b of the column. Pivotally supported on column 70 are a first pair of arms 73a and 73b and a second pair of arms 74a and 74b. Arms 73a, 73b, 74a and 74b are fabricated of a highly elastic material, such as steel. When column 70 is inserted in well 40, arms 73a, 73b, 74a and 74b are folded upwardly against column 70 so as to permit easy movement of the column down into the well. When the shale oil deposits 42 are to be mined (these deposits including alternate shale and kerogen layers 42a and 42b respectively), oscillator 72 is energized to provide vibratory energy to column 70. The speed of oscillator 72 is preferably adjusted to cause resonant standing wave vibration of the column. Pivotal arms 73a, 73b, 74a and 74b are vibrated along with column 70 to act as effective radiators for the sonic energy, the arms swinging outwardly against the sides of the well and gradually spreading out as the shale oil deposits are broken away and the cavity is enlarged as shown in FIG. 3. If so desired, column 70 may be slowly rotated to enable the arms to break away a large circular area of the deposits.

As for the previous embodiments, the shale oil deposits are engulfed with a carrier liquid during the vibratory pulverizing action, this liquid, as already mentioned, being fed into the column through inlet 70a and exited into the well at the bottom opening 70b of the column. The carrier liquid carrying kerogen particles either in suspension or solution, depending on whether or not the liquid is a solvent, is exited from the well through outlet 75 by means of suitable pumping action.

When the mining operation has been completed with the pivotally supported arms in a horizontal position, as indicated for arms 74a and 74b (or with the arms downwardly beyond this position), the column 70 may be lifted out of the well with the arms pivotally falling downwardly against the sides of column 70 so that they can pass upwardly through the well bore hole.

Figure 4:
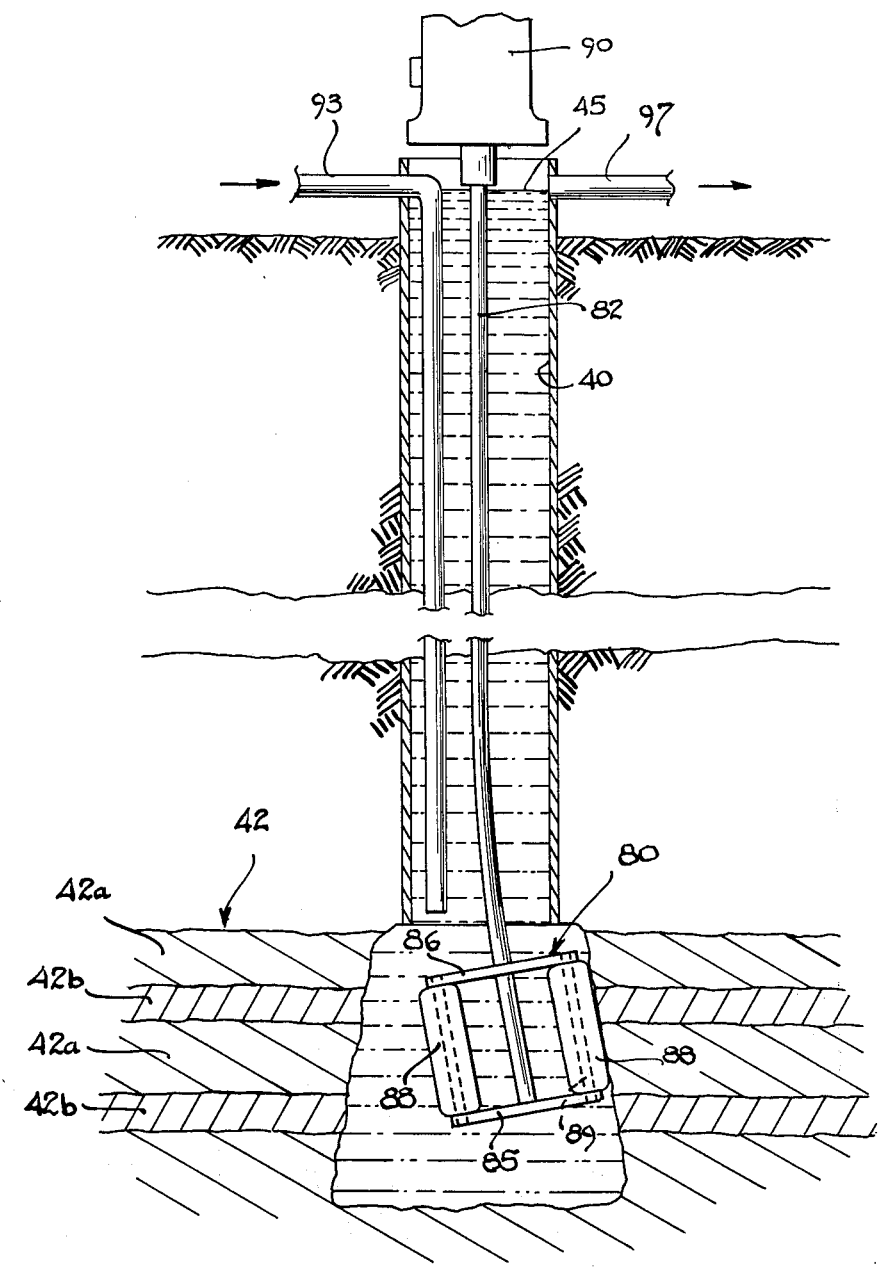
FIG. 4 is an elevational view in cross section of a fourth embodiment of my invention.

Referring now to FIG. 4, still another embodiment of the invention for use in in situ mining is illustrated. In this embodiment, a cage structure 80 is lowered into the well 40 on flexible drive shaft 82. Cage structure 80 is formed from a pair of support arms 85 and 86 between which a plurality of rollers 88 are rotatably supported, these rollers having a hollow center through which rods 89 are fitted, these rods being fixedly attached at their ends to support arms 85 and 86. Flexible shaft 82 is rotatably driven by means of motor 90, thereby resulting in rotation of the cage structure 80. The cage structure, being on the end of flexible shaft 82, is rotated in a gyratory fashion, the rollers forming in effect impacters which impact against the shale oil deposits in a vibratory manner. During the vibratory impaction, the carrier liquid 45 is fed into the well through hose line 93 such that the shale oil deposits are covered with the liquid. As with the previous embodiments, the shale oil deposits are comminuted by the vibratory action with the lighter kerogen material rising to the top of the liquid and thus separated from the shale. The kerogen bearing liquid is exited from the well through outlet 97 by suitable pumping action.

While the invention has been described and illustrated in detail, it is to be clearly understood that this is intended by way of illustration and example only and is not to be taken by way of limitation, the spirit and scope of this invention being limited only by the terms of the following claims.

I claim:

1. Apparatus for in situ removal of kerogen or the like from oil shale deposits from a well including such deposits along the side walls of the well bore comprising:
   sonic radiator means,
   means for suspending the sonic radiator means in said well adjacent to said deposits,
   means for flowing a carrier liquid into the well in contact with said deposits,
   means for providing high level sonic energy to said radiator means for driving said radiator means against the side walls of the well and comminuting the oil shale along said side walls to shale and kerogen particles, the kerogen particles rising toward the top of said liquid with the shale particles falling to the bottom of said liquid, the bore of the well being laterally enlarged as the oil shale is comminuted, and means for removing said liquid from the well.

2. The apparatus of claim 1 wherein said means for generating sonic energy comprises an orbiting mass oscillator and said radiator means forms part of a resonant vibration system, the frequency of said oscillator being adjusted to cause standing wave resonant vibration of said radiator means.

3. Apparatus for in situ removal of kerogen or the like from deposits from a well comprising:

sonic radiator means, means for suspending the sonic radiator means in said well adjacent to said deposits, means for flowing a carrier liquid into the well in contact with said deposits, means for providing high level sonic energy said radiator means comprising an orbiting mass oscillator, and means for removing said liquid from the well, said radiator means forming part of a resonant vibration system and including a toggle mechanism comprising arm members pivotally joined to each other and to said oscillator, said toggle mechanism expanding when bottomed in the well so as to continually impinge against at least a portion of the sides of the well, the frequency of said oscillator being adjusted to cause standing wave resonant vibration of said radiator means, whereby the sonic energy comminutes the oil shale to shale and kerogen particles, the kerogen particles rising toward the top of said liquid with the shale particles falling to the bottom of said liquid.

4. Apparatus for in situ removal of kerogen or the like from deposits from a well comprising:

arm means for radiating sonic energy, column means for pivotally suspending the arm means in said well adjacent to said deposits such that said arm means continually abuts against the walls of said well as material is removed therefrom, means for flowing a carrier liquid into the well in contact with said deposits, orbiting mass oscillator means for providing high level sonic energy to said column means and arm means, said arm means and column means forming part of a resonant vibration system, the frequency of said oscillator being adjusted to cause standing wave vibration of said column means and arm means, and means for removing said liquid from the well, whereby the sonic energy comminutes the oil shale to shale and kerogen particles, the kerogen particles rising toward the top of said liquid with the shale particles falling to the bottom of said liquid.

* * * * *